(12) United States Patent
Cisar et al.

(10) Patent No.: US 6,638,657 B1
(45) Date of Patent: Oct. 28, 2003

(54) FLUID COOLED BIPOLAR PLATE

(75) Inventors: Alan Cisar, Cypress, TX (US); Oliver Murphey, Bryan, TX (US)

(73) Assignee: Lynntech Power Systems, Ltd., College Station, TX (US)

( * ) Notice: Subject to any disclaimer, the term of this patent is extended or adjusted under 35 U.S.C. 154(b) by 157 days.

(21) Appl. No.: 09/655,741

(22) Filed: Sep. 6, 2000

Related U.S. Application Data (63) Continuation of application No. 08/787,271, filed on Jan. 24, 1997, now Pat. No. 6,146,780.

(51) Int. Cl.[7] .................................................. H01M 8/04
(52) U.S. Cl. ........................... 429/35; 429/34; 429/210
(58) Field of Search .............................. 429/34, 210, 35

(56) References Cited

U.S. PATENT DOCUMENTS

| | | | |
|---|---|---|---|
| 4,175,165 A | 11/1979 | Adlhart | |
| 4,297,421 A | * 10/1981 | Turillon et al. ............. | 429/225 |
| 4,533,455 A | 8/1985 | Balko et al. | |
| 4,619,753 A | 10/1986 | Christen et al. | |
| 4,900,643 A | 2/1990 | Eskra et al. | |
| 4,973,358 A | 11/1990 | Jin et al. | |
| 5,112,703 A | 5/1992 | Koenig | |
| 5,200,281 A | 4/1993 | Leap et al. | |
| 5,264,305 A | 11/1993 | Charkey | |
| 5,348,817 A | 9/1994 | Rao et al. | |
| 5,482,792 A | 1/1996 | Faita et al. | |
| 5,496,655 A | 3/1996 | Lessing | |
| 5,578,388 A | 11/1996 | Faita et al. | |
| 5,589,662 A | 12/1996 | Schleicher et al. | |
| 5,776,624 A | * 7/1998 | Neutzler ..................... | 429/26 |
| 5,800,946 A | 9/1998 | Grosvenor et al. | |
| 6,022,634 A | 2/2000 | Ramunni | |
| 6,099,984 A | * 8/2000 | Rock .......................... | 429/39 |
| 6,171,720 B1 | * 1/2001 | Besmann et al. ......... | 429/34 X |
| 6,183,623 B1 | * 2/2001 | Cisar et al. | |

FOREIGN PATENT DOCUMENTS

| | | |
|---|---|---|
| EP | 0 154 772 A1 | 1/1984 |
| EP | 0 629 015 A1 | 4/1994 |
| EP | 0 817 297 A2 | 12/1994 |
| EP | 0 784 352 A1 | 7/1997 |

* cited by examiner

Primary Examiner—John S. Maples
(74) Attorney, Agent, or Firm—Streets & Steele; Steven L. Christian; Jeffrey L. Streets (57) ABSTRACT

The present invention provides a separator for electrochemical cells, comprising a gas barrier having an electrically conducting pathway extending therethrough and a porous, electrically conducting member in electrical contact with each side of the electrically conducting pathway. In another aspect of the invention, a separator for electrochemical cells is provided comprising a porous, electrically conducting sheet and a gas impermeable material disposed within a portion of the sheet to form a gas barrier. In yet another aspect of the invention, a separator for electrochemical cells is provided comprising two porous, electrically conducting sheets and an electrically conducting gas barrier disposed in electrical contact between the sheets.

42 Claims, 8 Drawing Sheets

FLUID COOLED BIPOLAR PLATE

This Application is a continuation application of U.S. patent application Ser. No. 08/787,271 filed on Jan. 24, 1997, now U.S. Pat. No. 6,146,780.

This invention was made with government support under contract N00014-95-C-0023 awarded by Navy/DARPA. The government has certain rights in this invention.

BACKGROUND OF THE INVENTION

1. Field of the Invention

The present invention relates to separators between adjacent electrochemical cells. More particularly, the invention relates to lightweight bipolar plates and methods for their construction.

2. Background of the Invention

Electrochemical cells utilizing a proton exchange membrane (PEM) can be configured in cell stacks having bipolar separator plates between adjacent cells. These bipolar separator plates are typically made from a variety of metals, such as titanium and stainless steel, and non-metallic conductors, such as graphitic carbon. Bipolar separator plates can be fabricated by machining fluid flow fields into a solid sheet of the material. The flow fields are made up of a series of channels or grooves that allow passage of gases and liquids.

Figure 1:
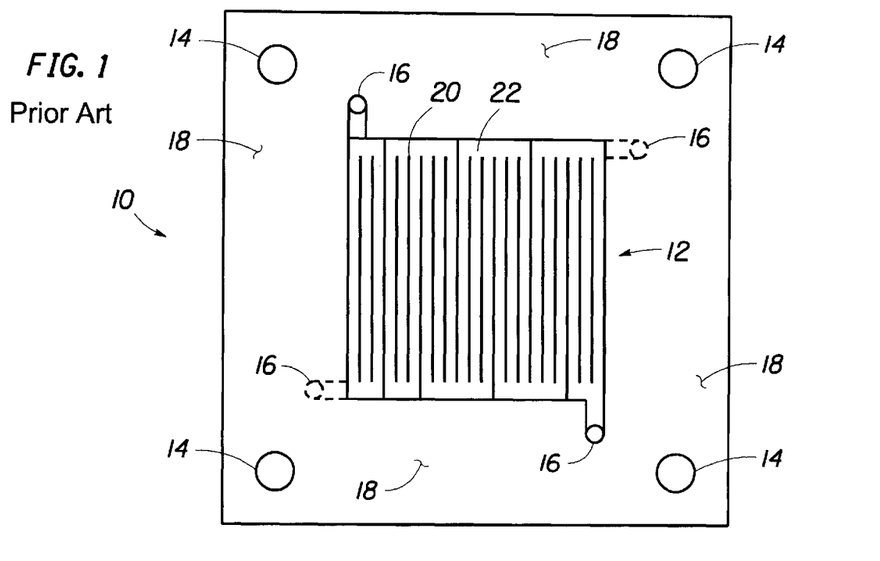
FIG. 1 is a typical metal separator plate with a serpentine flow field design. This design features three parallel channels along each leg with a common manifold connecting each set of channels to the next.

FIG. 1 is a face view of a prior art bipolar separator plate 10 made from a solid sheet of a conducting material. The central portion of the plate has a flow field 12 machined into its surface. The flow field may direct fluid flow in many patterns, but is illustrated here as parallel serpentine channels. Around the perimeter of the flow field 12, the plate provides a plurality of bolt holes 14 for assembling and securing a cell stack, various manifolds 16 for communicating fluids in and out of the stack, and a flat surface 18 that allows the plate to be sealed with adjacent components of the cell stack.

In addition to providing a fluid flow field, a bipolar separator plate for use in electrochemical cells must collect electrons liberated at one electrode, conduct the electrons through the plate, and deliver electrons to the face of another electrode on the opposing side of the plate. The prior art bipolar separator plate collects and delivers electrons from electrodes of opposing cells through the ridges 20 remaining between the channels 22 in the flow field 12.

Figure 2:
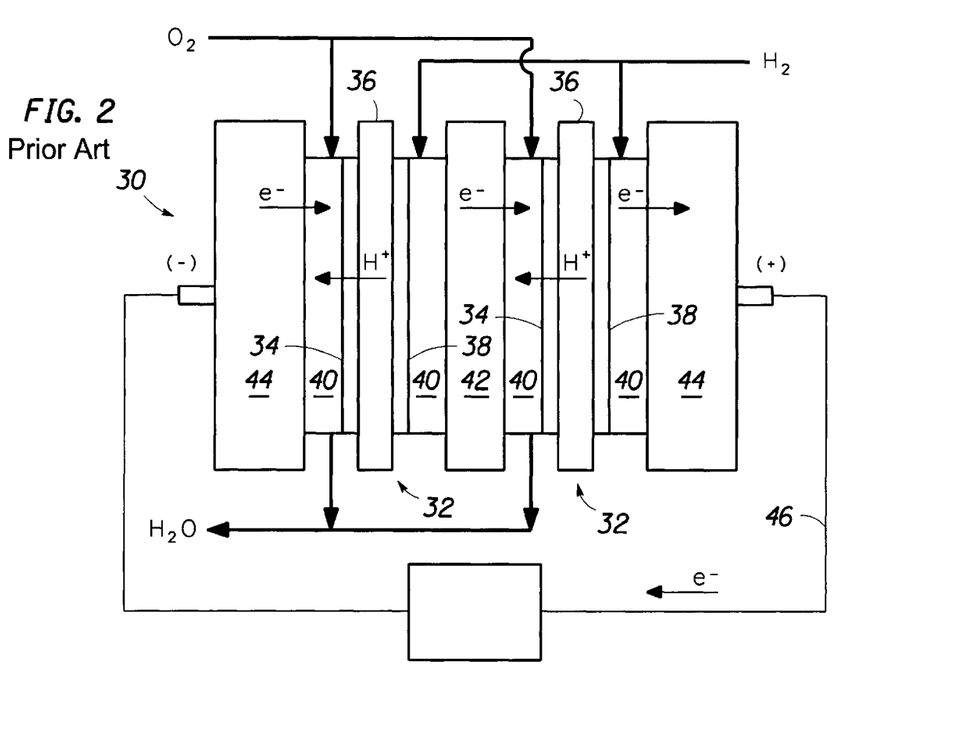
FIG. 2 is a schematic cross-section of a PEM fuel cell illustrating the key features. The thickness of the membrane has been greatly exaggerated for clarity.

FIG. 2 is a schematic view of a proton exchange membrane (PEM) electrochemical cell 30 configured as a hydrogen-air fuel cell. This stack comprises two identical fuel cells 32 having a cathode 34, a PEM 36 and an anode 38. Flow fields 40 (shown schematically for clarity) are provided on either side of the bipolar separator plate 42, as well as on the internal faces of the endplates 44. Electrons liberated at the anode 38 provide current flow to the cathode 34 of a cell on the other side of the plate 42 and, ultimately, through an external circuit 46. Electrons are then combined with protons and oxygen at the cathode 34 to form water. The electrical potential of the fuel cell 30 is increased by adding more cells 32 to the stack.

Weight is a characteristic of electrochemical cells generally, and fuel cells in particular, that limits their use. Therefore, significant efforts have been directed at providing lightweight components for electrochemical cells. Even so, there remains a need for a lightweight bipolar separator plate. It would be desirable if the lightweight bipolar separator plate could also be made thinner and support higher current densities. It would be further desirable if the structure of the bipolar separator plate allowed the introduction of other specific properties, such as water permeability and reactant gas impermeability.

SUMMARY OF THE INVENTION

The present invention provides a separator for electrochemical cells comprising a gas barrier having an electrically. conducting pathway extending therethrough and a porous, electrically conducting member in electrical contact with each side of the electrically conducting pathway, the member selected from the group consisting of expanded metal mesh, metal foam, conducting polymer foam, porous conductive carbon material and combinations thereof. The electrically conducting pathway through the gas barrier may be formed from a second porous, electrically conducting member selected from the group consisting of expanded metal mesh, metal foam, conducting polymer foam, porous conductive carbon material and combinations thereof. The gas barrier may be comprised of a metal sheet or a polymer filled porous, electrically conducting member.

In another aspect of the invention, a separator for electrochemical cells is provided comprising a porous, electrically conducting sheet selected from the group consisting of expanded metal mesh, metal foam, conducting polymer foam, porous conductive carbon material and combinations thereof and a gas impermeable material, such as a polymer or metal, disposed within a portion of the sheet to form a gas barrier. The gas impermeable polymers are selected from the group consisting of water permeable polymers, thermoplastic polymers, reactively cured polymers, and combinations thereof.

In yet another aspect of the invention, a separator for electrochemical cells is provided comprising two porous, electrically conducting sheets selected from the group consisting of expanded metal mesh, metal foam, conducting polymer foam, porous conductive carbon material and combinations thereof and an electrically conducting gas barrier disposed in electrical contact between the sheets.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention provides improved, lightweight bipolar separator plates and methods for their manufacture. The weight of the separator is minimized by reducing the amount of dense materials (solid metal or graphite) that are used and replacing them with lighter materials. Solid materials are used only where dictated to provide structural strength, such as the outer frame of the bipolar plate where a gas seal must be achieved. Other parts of the plate, such as the flow field, are constructed from electrically conductive materials having a lower density, such as expanded metal mesh, or foamed metal. While these lower density materials are electrically conductive, they are not gas tight and, if used alone, would not provide a sufficient gas barrier. However, in accordance with the present invention a gas barrier can be used in conjunction with these low density materials.

In one aspect of the invention, a bipolar separator plate is provided with a thin, electrically conductive sheet forming a gas tight barrier. Conductive sheets, such as titanium, provide much thinner gas barriers than can be achieved by machining a solid metal plate to leave a flow field and a barrier structure. Sheets of low density, electrically conductive material are placed in electrical contact on both sides of the barrier, so that the low density material serves as the flow field.

In another aspect of the invention, a bipolar separator plate is provided by forming a polymer barrier inside a sheet of low density metal. The polymer is disposed into the pores of the low density metal to form a gas barrier. It is preferred that the polymer fill only a region of pores, leaving another region to serve as a flow field. Polymers with special properties, such as water permeability, may be used for the gas barrier to provide the separator plates with additional advantages.

In yet another aspect of the invention, the porous flow fields may be provided with grooves or channels to improve the distribution of fluid and reduce the pressure drop across the flow field. While the grooves may take on a number of patterns, the preferred groove pattern is interdigitated. The interdigitated pattern includes finger-like channels that freely communicate fluid from the inlet manifold into the flow field, yet requires the fluid to pass through at least a portion of the porous flow field before communicating with adjacent finger-like channels communicating with the outlet manifold.

In a further aspect of the invention, a bipolar separator plate is provided with a frame having channels formed therein for fluid communication with the edges of the flow field. The frame may be made of a solid material, such as metal, a polymer material or combinations thereof. The direction of fluid flow in the anode and cathode flow fields may be either parallel or cross flow, as is determined by the fluid channels and manifolding in the frame. It should be recognized that within a given cell stack, the manifolding must be consistent throughout.

Figure 3A:
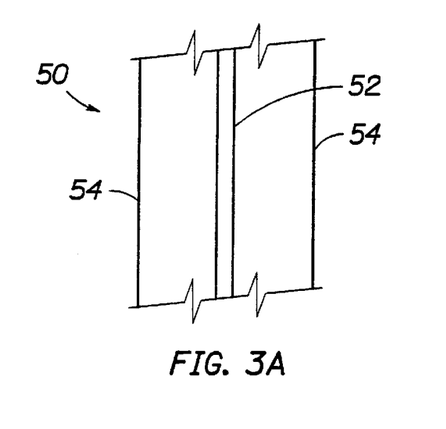
FIGS. 3A and 3B are a partial cross-sectional view and a face-on view of a bipolar plate constructed by spot welding expanded titanium flow fields to both sides of a titanium barrier layer. The titanium can be gold plated after welding to prevent oxidation of the metal in the fuel cell environment.
Figure 3B:
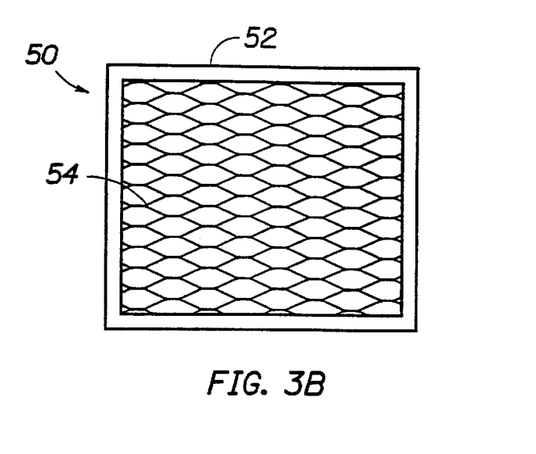

Now referring to FIGS. 3A and 3B, a cross-sectional view of a bipolar plate 50 is shown constructed with a thin, metal sheet 52 having a flow field 54 made of expanded metal mesh spot welded to both sides thereof. The metal sheet 52 forms an impermeable barrier across the entire face of the plate 50 and the expanded metal mesh forms the fluid flow field 54. The sheet and mesh may be made from titanium SS, Al, Mg, or alloys thereof most preferably titanium metal. It is most preferred that the titanium bipolar plate 50 be plated with a noble metal, gold, or other materials after welding to prevent oxidation and corrosion of the metal in the fuel cell environment.

Figure 4:
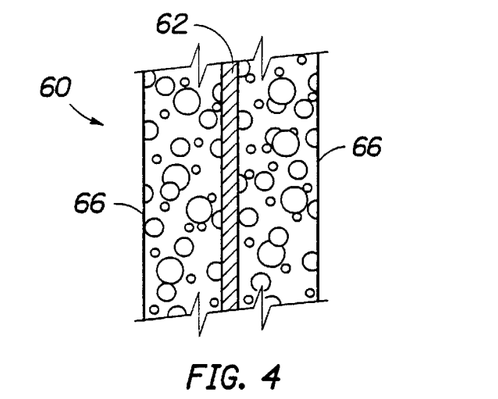
FIG. 4 is a partial cross-section of an all metal lightweight bipolar plate. This design features a thin ($\leq 0.006''$) barrier made from solid titanium sheet with foamed metal flow fields welded to both sides of it.

Now referring to FIG. 4, a cross-sectional view of an all metal bipolar plate 60 is shown constructed with a thin, metal sheet 62 having metal foam flow fields 66. This bipolar plate features a thin ($\leq 0.006''$) barrier sheet 62, preferably made from a solid titanium sheet, with metal foam (about ⅛ inch thick) welded to both sides thereof. The metal sheet 62 again forms the gas barrier and the metal foam 66 forms the fluid flow fields. Metals that can be prepared as a solid foam in accordance with the present invention include copper, aluminum, nickel, titanium, silver, and stainless steel, with the preferred metals being nickel and stainless steel. The density of the metal foam used in the sheet 66 can be up to about 50 percent metal by volume, but the preferred density of the foamed metal is between about 3 and about 15 percent metal by volume, with the most preferred density being between about 5 and about 10 percent by volume. A variety of foamed metals are available from AstroMet, Cincinnati, Ohio. Methods for producing these metal foams are described in U.S. Pat. No. 4,973,358, which is incorporated herein by reference.

Figure 5:
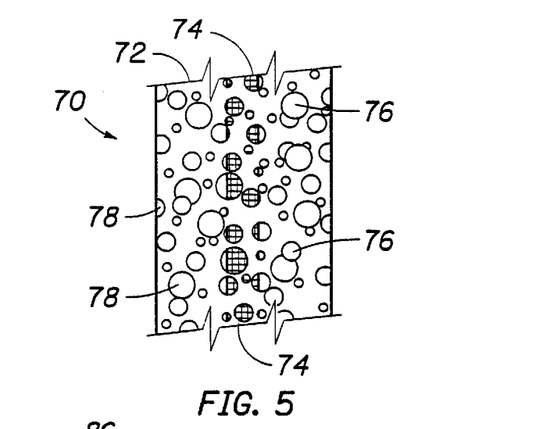
FIG. 5 is a partial cross-sectional view of a sheet of copper foam having a polymer barrier in the center of the sheet.

Now referring to FIG. 5, a cross-sectional view of a bipolar plate 70 is shown that is made of a metal foam sheet 72 having a polymer barrier 74 in the center of the sheet. The first step in forming the polymer barrier 74 includes disposing a removable material (not shown) in the pores along a first side 76 of the metal foam sheet 72 where a flow field is desired. With the open pores on the second side 78 facing upward, a viscous polymer or polymer precursor is poured over the second side 78 and allowed to penetrate into the sheet 72 until the polymer comes into contact with the removable material. After allowing the polymer to harden or cure, the removable material is removed, leaving an impermeable gas barrier 74 within a central region of the metal foam sheet 72. The regions with open pores on either side 76,78 of the gas barrier 74 form the flow fields. The removable material may be a solid, such as sugar, that is removable by dissolution in a solvent, such as water. Alternatively, the removable material may be a fluid in which the metal foam is partially immersed, wherein the polymer is immiscible in and floats on the fluid. It should be noted that it may be necessary to clean these bipolar plates prior to actual use.

Figure 6:
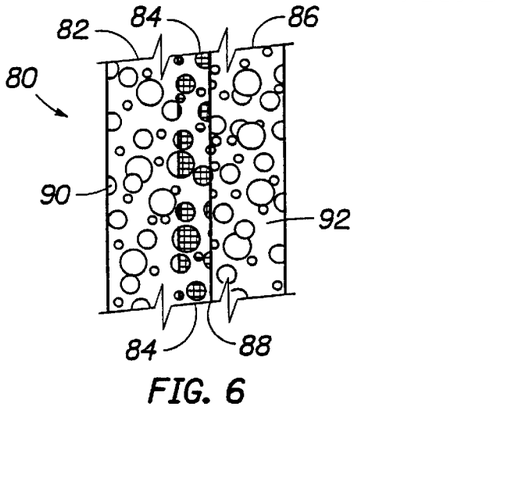
FIG. 6 is a partial cross-sectional view of a first copper foam sheet having a polymer barrier formed along one side and a second copper foam sheet in electrical contact with the first copper foam sheet.

Now referring to FIG. 6, a cross-sectional view of a bipolar plate 80 is shown having a first copper foam sheet 82 with a polymer barrier 84 formed along one face 88 and a second copper foam sheet 86 in electrical contact with the face 88 of the first copper foam sheet 82. This configuration of two foam sheets 82,86 eliminates the difficulty of disposing the polymer into a central region of the metal foam. One face of the first metal foam sheet 82 is immersed into or coated with a polymer which is allowed to cure. Alternatively, a thermoplastic material can be heated and pressed into the metal foam sheet 82 where it is allowed to cool. In this manner, the first metal foam sheet 82 provides a gas barrier 84 along a first face 88 and a flow field 90 on the opposing face. The second foam sheet 86, providing a second flow field 92, is then placed in contact with the first face 88 of the first metal foam sheet 82. While not necessary, it is generally preferred that the two metal foam sheets 82,86 be spot welded together at various points around the perimeter. So constructed, this bipolar separator plate 80 functions in the same manner as the bipolar plate of FIG. 5.

Now referring to FIGS. 7A, 7B, 8A and 8B, front and side views of two types of frames 100 for a bipolar plate are shown. The frames 100 provide channels 102 for fluid communication between the flow fields 104 and the corresponding manifolds 106. The frames 100 have a thickness that is substantially equal to the thickness of the bipolar plate (See FIGS. 3–6), typically between about $\frac{1}{16}$ and about $\frac{1}{4}$ inch. In FIG. 7, the channels 102 on opposing sides of the frame 100 are perpendicularly disposed to cause a cross flow of fluids, i.e. flow between manifolds 106 and flow between manifolds 108. In FIG. 8, an alternate frame 100 for a bipolar plate is shown having channels 102 on opposing sides of the frame 100 disposed in a parallel arrangement to cause parallel flow of fluids over the opposing flow fields of the plate.

Figure 9:
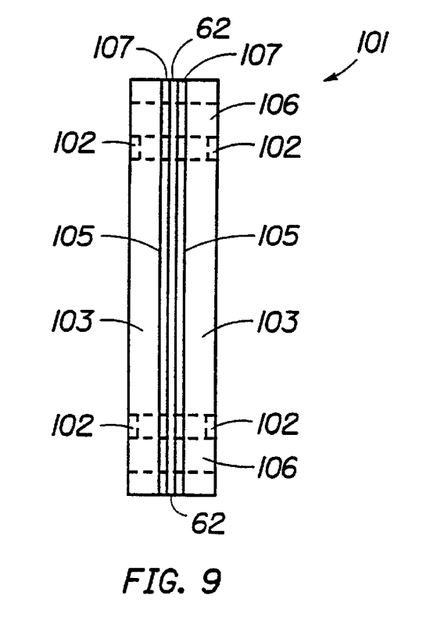
FIG. 9 is a side view of a bipolar plate having dual frame members.

Now referring to FIG. 9, a side view of a bipolar plate 101 is shown having dual frame members 103. Each of the frame members 103 have channels 102 on their exposed face, a manifold 106 passing therethrough and a sealing face 105. The sealing face is substantially flat and is pressed against a thin rigid gas barrier, such as the barrier 62 shown in FIG. 4, having mating manifolds cut therethrough. Preferably, the frame members 103 are slightly elastic to form seals with adjacent cell components (not shown) and the gas barrier 62. Alternately, gaskets 107 with mating manifolds cut therethrough may be required on either sealing face 105 and between adjacent cell components (not shown).

Referring briefly back to FIG. 2, the contact between the electrodes 34,38 and the adjacent flow fields 40 should include about 50% of the geometric area of the electrode 34,38. This degree of contact allows the electrons to pass between the electrodes and flow fields with minimal resistance while maintaining sufficient open area for contacting the fluid with the electrode catalyst surface. Therefore, in accordance with the present invention, the small openings or pores in the flow field material 40 preferably have at least one dimension averaging less than about one millimeter.

The thickness of the bipolar plates of the present invention is determined primarily by the operating pressure of the cell stack. Where gases or liquids are provided to the stack under high pressures, the thickness of the flow fields can be reduced. However, in many applications the use of high pressure pumps consumes significant amounts of the electricity generated by the fuel cell and, thereby, result in an inefficient system Low pressure gas and liquid sources, typically between about 0.1 and about 2 psig, may be used in conjunction with flow fields having a thickness greater than about $\frac{1}{16}$ inch. Conversely, when a flow field becomes too thick, portions of the fluid flow may begin to channel or bypass the electrode surface. Therefore, for use in electrochemical cells having electrodes between about 4 and about 50 square inches of geometric surface area, it is preferred that flow fields have a thickness between about $\frac{1}{16}$ and about $\frac{1}{8}$ inch.

The term "air stoichiometry" refers to the ratio of actual air (oxygen) flow provided through the fuel cell to theoretical air (oxygen) flow required to carry out the fuel cell reactions. In general, as the excess of the oxygen reactant increases, the performance of the cell also increases. Therefore, a greater air stoichiometry provides increased cell performance. However, as discussed above, higher air stoichiometry is provided by increasing the flow rate of air through the cathode flow field which typically will require a high air feed pressure.

EXAMPLE 1

Figure 7A:
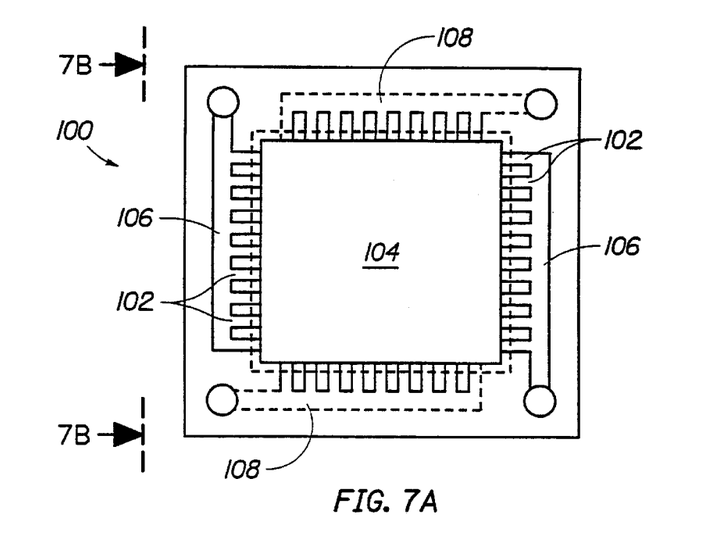
FIGS. 7A and 7B are front and side views of a frame for a bipolar plate.
Figure 7B:
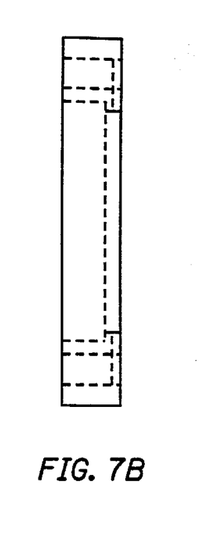
Figure 8A:
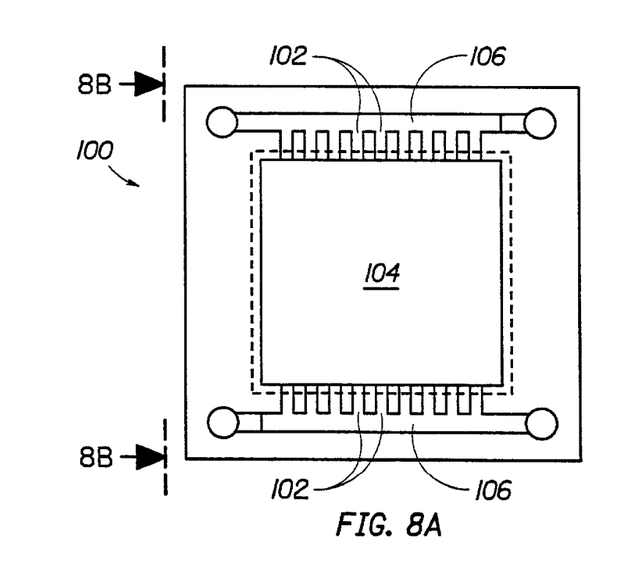
FIGS. 8A and 8B are front and side views of an alternate frame for a bipolar plate having parallel gas flows rather than the cross flow arrangement of the frame in FIGS. 7A and 7B.
Figure 8B:
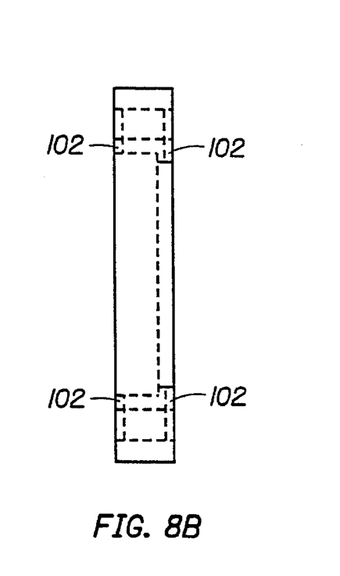

A bipolar plate was produced by first mounting a sheet of 0.006" (0.15 mm) titanium in an $\frac{1}{8}$ inch thick, lightweight aluminum frame having a cross flow design as shown in FIG. 7. This metal sheet served as the gas barrier. The flow fields were produced by welding pieces of 0.06 inch thick (overall thickness), expanded titanium having diamond shaped openings about 1 mm in the short dimension and 2 mm in the long dimension to either side. Because the fluid flow pattern was cross flow, the two expanded titanium sheets were oriented at 90° to each other with the long axis of the diamond pattern in-line with the flow pattern on each side barrier. After spot welding the flow fields, the titanium was gold plated to prevent the formation of an insulating layer of titanium oxide on the surface of the flow field.

Figure 10:
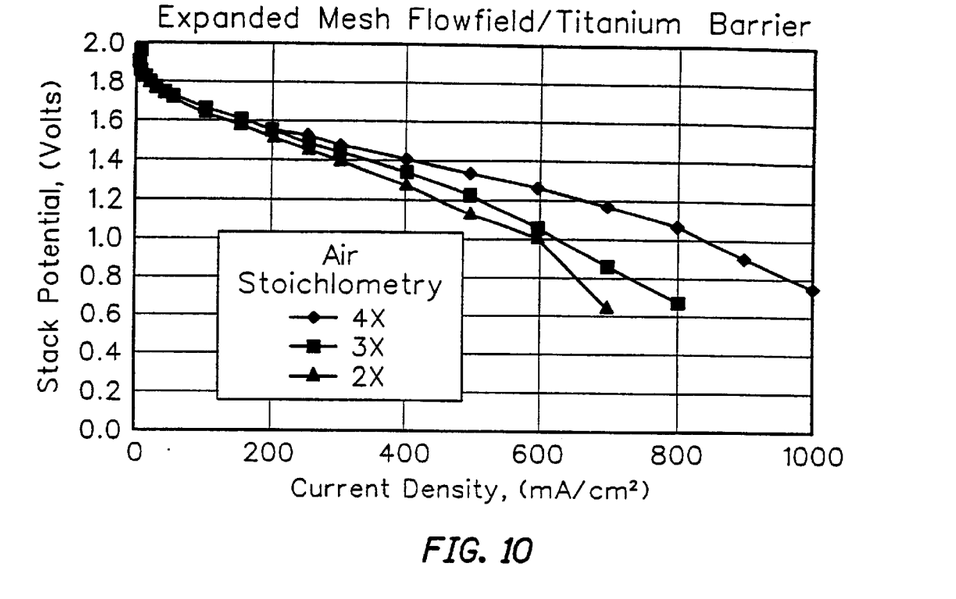
FIG. 10 provides polarization curves for a two-cell stack using a bipolar plate with expanded titanium flow fields operating at 75° C. and 36 psig pressure at three air stoichiometries.

The bipolar plate was then installed into a PEM fuel cell stack having only two cells. The stack was operated at a temperature of 75° C., pressures of 36 psig, and air stoichiometries of 2×, 3× and 4×theoretical. The polarization curves obtained from these runs are shown in FIG. 10. Following these runs, the stack was disassembled and examined. There was no evidence of corrosion on any parts.

EXAMPLE 2

Figure 11:
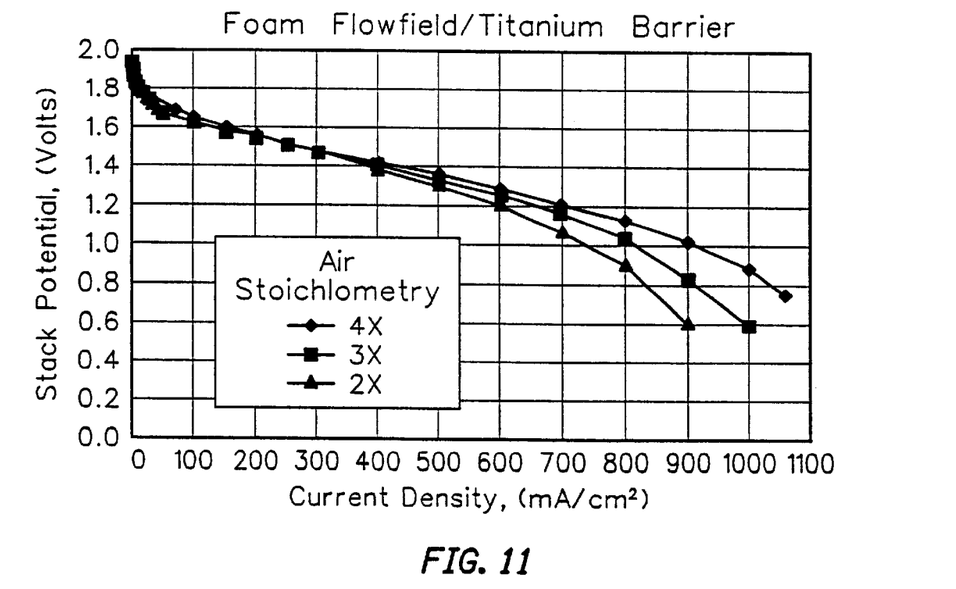
FIG. 11 provides polarization curves for a two-cell stack using a bipolar plate with gold plated foamed copper flow fields operating at 75° C. and 36 psig pressure at three air stoimetries.

A second bipolar plate was produced using a ⅛ inch aluminum frame with a sheet of 0.006" titanium bonded into the frame. Foamed copper having a thickness of about ¹⁄₁₆ inch was welded in a position contacting the titanium barrier and then gold plated. The bipolar plate was inserted into the same two cell stack as in Example 1. In FIG. 11, polarization curves are provided for the stack operating at 75° C., 36 psig pressure, and three air stoichiometries (2×, 3× and 4×). This performance is clearly an improvement from the results of the expanded metal bipolar plate of Example 1, since the stack operated at greater current densities for a given stack potential.

At the conclusion of the run, the stack was dismantled and the components inspected No visible attack or degradation of the bipolar plate was observed.

EXAMPLE 3

A third bipolar plate was produced with a polymer barrier. In this case, a ³⁄₁₆ inch sheet of foamed copper was partially impregnated with a reactively curable formulation including an epoxy resin having an epoxy equivalent weight of about 173 (available under the trademark EPON 862 from Shell Chemical Houston, Tex.), and a hardener having an equivalent weight of 190 (available under the trademark EPICURE from Shell Chemical, Houston, Tex.). The partially impregnated sheet was sealed into a ³⁄₁₆ inch aluminum frame against the inner support ridge machined into the inner pocket of the frame. The bipolar plate was then completed by attaching a thin, unfilled piece of foamed copper to the opposite side of the partially impregnated sheet.

Figure 12:
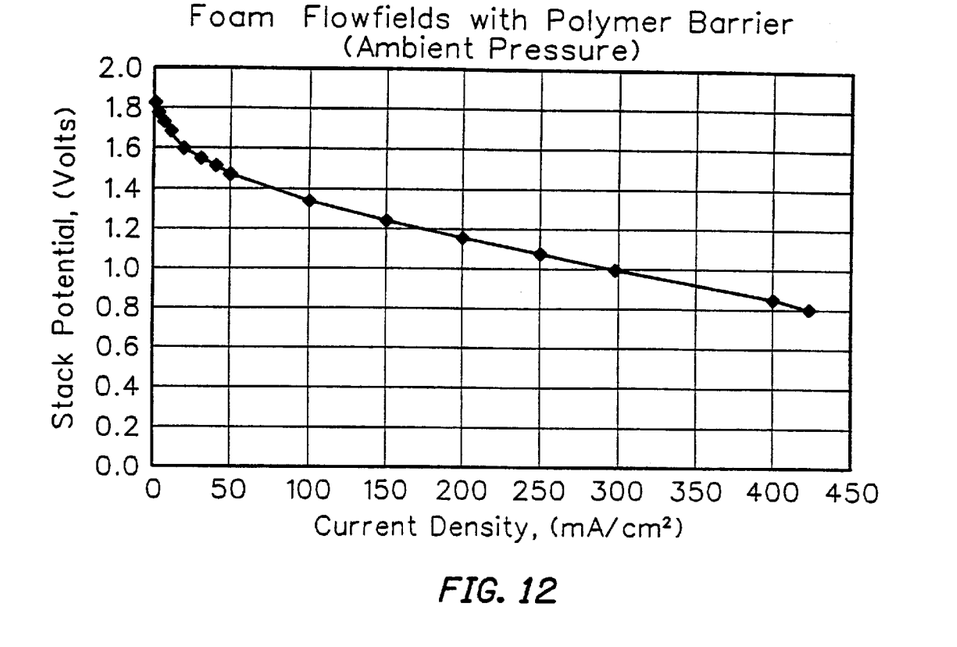
FIG. 12 provides a polarization curve for a two-cell fuel cell stack equipped with an Epon 862 filled copper foam bipolar plate operating on hydrogen/air at ambient pressure and 55° C.
Figure 13:
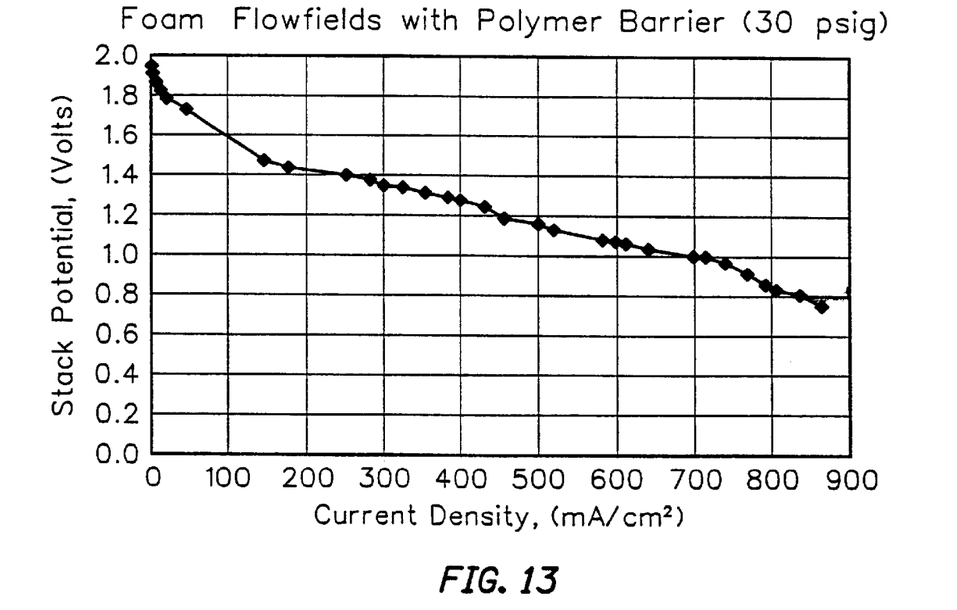
FIG. 13 provides a polarization curve for a two-cell fuel cell stack equipped with an Epon 862 filled copper bipolar plate operating on hydrogen air at 30 psig pressure and 65° C.

The bipolar plate was then installed into the two cell stack of Example 1. In FIG. 12, a polarization curve is shown for the fuel cell stack operating on hydrogen as fuel and air as the oxidizer at ambient pressure and 55° C. In FIG. 13, a polarization curve is shown for the fuel cell stack operating on hydrogen and air at 30 psig pressure and 65° C. The results for this cell, both at ambient and 30 psig pressures, do not show performance equal to that of Example 2.

Thermoplastic Gas Barriers

The same type of structure, metal foam with a polymer gas barrier can be fabricated using thermoplastic materials. A variety of polymers have been tested. In each case the polymer was heated to a temperature above the published softening point. The temperatures used for three polymers tested are tabulated in Table I.

TABLE I

Press and Transition Temperatures for Thermoplastic Gas Barriers

| Polymer | $T_{(press)}$(° C.) | $T_{(glass)}$(° C.) |
| --- | --- | --- |
| polyethersulfone | 343 | 232 |
| polycarbonate | 288 | 285 |
| nylon 6 | 268 | 246 |

The press temperatures listed in Table I are those that were experimentally determined to give the best results. All of the data included here are for polymers which produced plates that withstood at least 20 psig differential gas pressure. One important feature for producing a good gas barrier is the ability to form an even layer.

Polyethersulfone (PES) produced the cleanest demarcation of any of those examined. Polycarbonate (PC) barriers produced a good barrier layer but also showed signs of deeper it penetration into the foam. The Nylon 6 barrier was the roughest in appearance of the three thermoplastics tested.

When fabricating bipolar plates of the present invention with a thermoplastic gas barrier there is no cure time, only the cooling time, and the cooling time may be achieved in seconds. Therefore, forming the gas barrier with a thermoplastic polymer by hot pressing has the potential for easy automation and rapid production.

Water Permeable Polymers

In a PEM hydrogen/oxygen fuel cell, water is formed at the cathode by the reduction of oxygen. Water is also transported to the cathode electroosmotically from the anode side of the proton exchange membrane as each proton drags on average two to three water molecules with it. This electroosmotic drag will eventually dry out the anode face of the membrane, leading to higher internal resistance, and lower efficiency, unless it is replaced. Simple back diffusion within the membrane from the cathode to the anode is generally not enough to replace the electroosmotically moved water, even though water is being formed continuously at the cathode. The usual solution to this problem is to supply additional water, in the form of water vapor, in the fuel stream, but this requires the presence of an additional component, a humidifier, somewhere in the system.

In accordance with the present invention, a polymer having special properties may be used to form the gas barrier in a metal foam as shown in FIGS. 5 and 6. Using a water permeable polymer allows the high concentration of water present at the cathode to diffuse through the water permeable bipolar plate from the wet side (cathode) to the dry side (anode) where it evaporates into the fuel stream and is available to enter the membrane. Consequently, there is no need for any additional humidification equipment Preferred water permeable polymers for constructing the gas barrier in a bipolar plate according to the present invention include perfluorinated sulphonic acid polymers (such as Nafion™) and cellulose acetate.

Figure 14A:
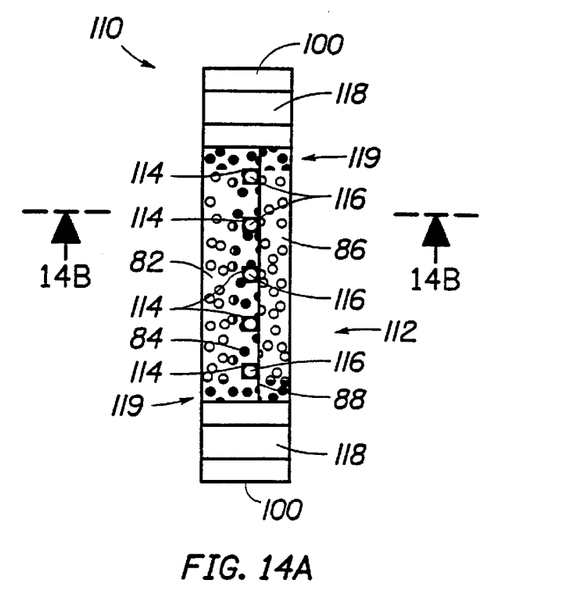
FIGS. 14A and 14B are top and side cross-sectional views of a bipolar plate with hollow tubes positioned therein and an injection molded frame.

Now referring to FIG. 14A, a side cross-sectional view of a framed bipolar plate 110 is shown with hollow tubes inserted to provide a fluid passage, such as for cooling. The framed bipolar plate 110 comprises a frame 100 and a metal foam bipolar plate 112. The bipolar plate 112 is constructed in a similar fashion to the bipolar plate 80 shown in FIG. 6. However, prior to forming the polymer gas barrier 84 in the first metal foam sheet 82, a plurality of grooves 114 are cut into the face 88. A plurality of hollow tubes 116 are then disposed into the grooves 114. Upon application of the polymer, the tubes 116 are held firmly within the grooves 114 and the gas barrier 84 is formed. Any polymer covering the electrically contacting surfaces of the face 88 is cleaned off and positioned in intimate contact with the second metal foam sheet 86. The two sheets 82,86 are then spot welded or otherwise positioned within the frame 100 for use in an electrochemical cell. While the hollow tubes may be used solely for purposes of cooling the cell, the present invention specifically includes the use of water permeable tubes in combination with a water permeable polymer gas barrier.

Figure 14B:
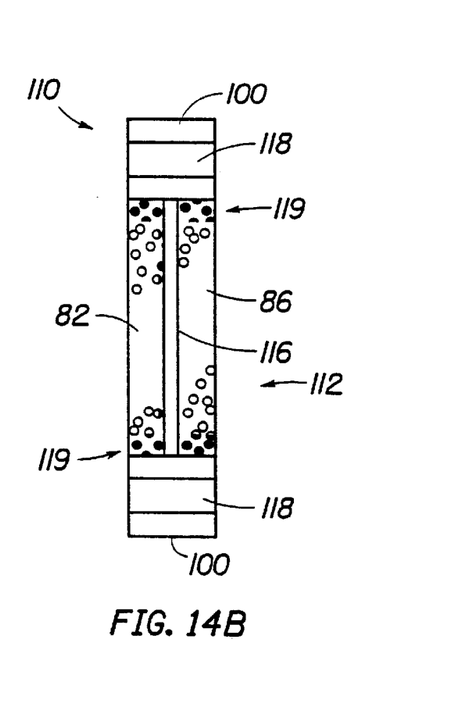

Now referring to FIG. 14B, a cross-sectional view of the framed bipolar plate 110 is shown as taken along a line 14B—14B in FIG. 14A The hollow tubes 116 preferably extend beyond the metal foam sheets 82,86 and communicate with the manifold 118. The frame 100 is preferably formed of a plastic material formed around the bipolar plate 112 with hollow tubes 116 by any available process, such as injection molding. During injection molding of the frame 100, the plastic material is forced into the pores in the edge regions 119 of the metal foam sheets 82,86 to form a permanent attachment.

Figure 15:
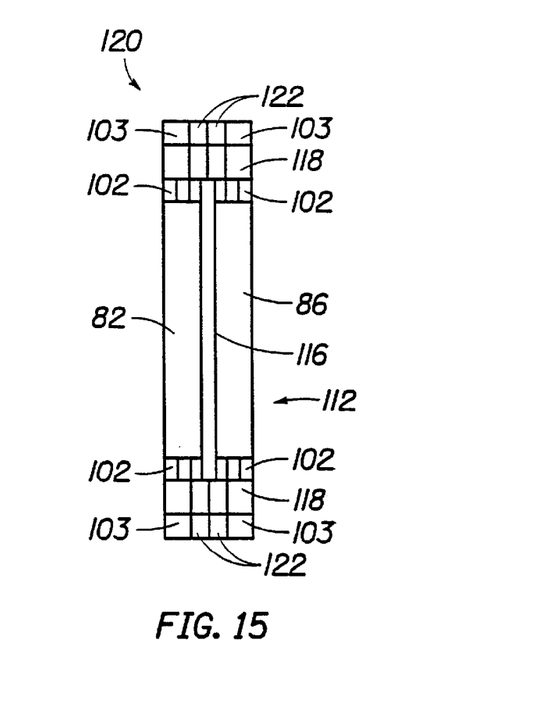
FIG. 15 is a cross-sectional view of a bipolar plate having hollow tubes positioned therein, dual frame members, and a pair of gaskets.

Now referring to FIG. 15, a cross-sectional view of a framed bipolar plate 120 is shown having an alternate frame securing a bipolar plate 112 having tubes 116 extending therefrom. The bipolar plate 112 is positioned within two dual frame members 103 and two gaskets 122, each having mating holes therein to form the manifolds 118. The tubes 116 are received between the gaskets 122 and communicate with the manifolds 118. The gaskets 122 are preferably made of a highly elastic material, such as unsintered polytetrafuoroethylene (PTFE), which will conformably seal around the tubes 116 and between the frame members 103. Note that it is not necessary to attach the members of the framed bipolar plate 120 together, since during operation the members will be placed in intimate contact by compression. The construction and assembly of an electrochemical cell is described by Murphy et al. in U.S. Pat. No. 5,460,705 which is incorporated herein by reference.

Figure 16A:
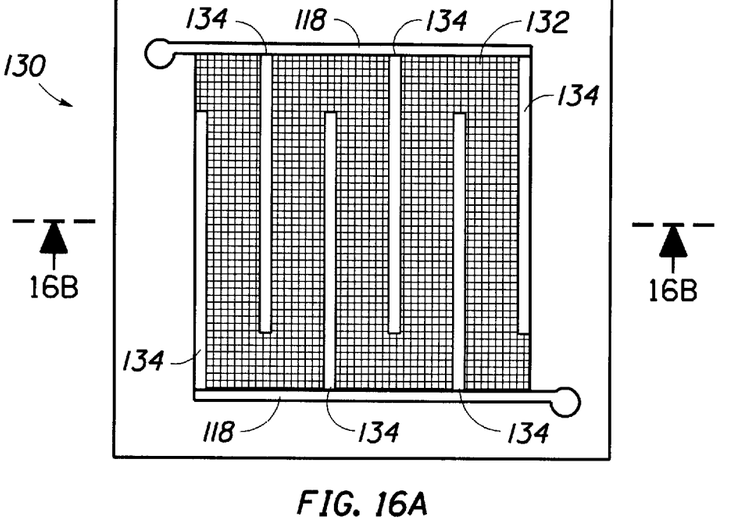
FIGS. 16A and 16B are face and edge views of a polymer modified metal foam bipolar plate having interdigitated flow fields to improve the gas distribution at the surface of the electrodes and reduce the pressure drop.
Figure 16B:
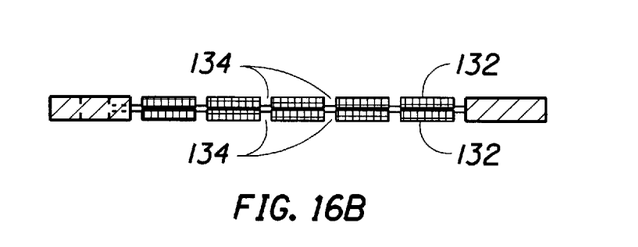

Now referring to FIGS. 16A and 16B, front and edge views of a bipolar plate 130 are shown having metal foam flow fields 132 with channels 134 to improve the gas distribution at the surface of the adjacent electrodes (not shown) and to reduce the pressure drop of the fluid passing through the flow fields 132. While the channels 134 may be cut in virtually any configuration or pattern, it is preferred that the channels do not provide a pathway from one manifold 118 to the other manifold 118, with the most preferred channels 134 being interdigitated as shown in FIG. 16A.

Figure 17:
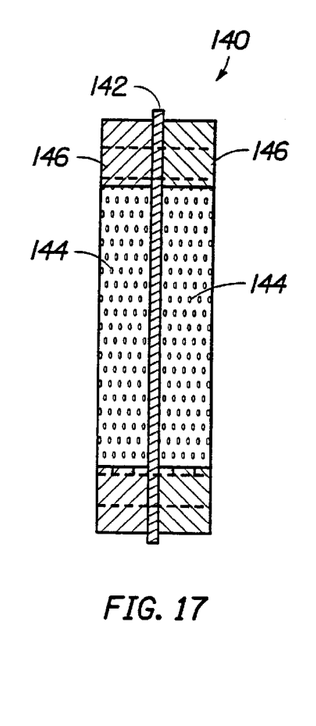
FIG. 17 is a partial cross-sectional view of a bipolar plate having a metal gas barrier with porous metal flow fields and polymer cell frames, which also serve as gaskets.
Figure 18:
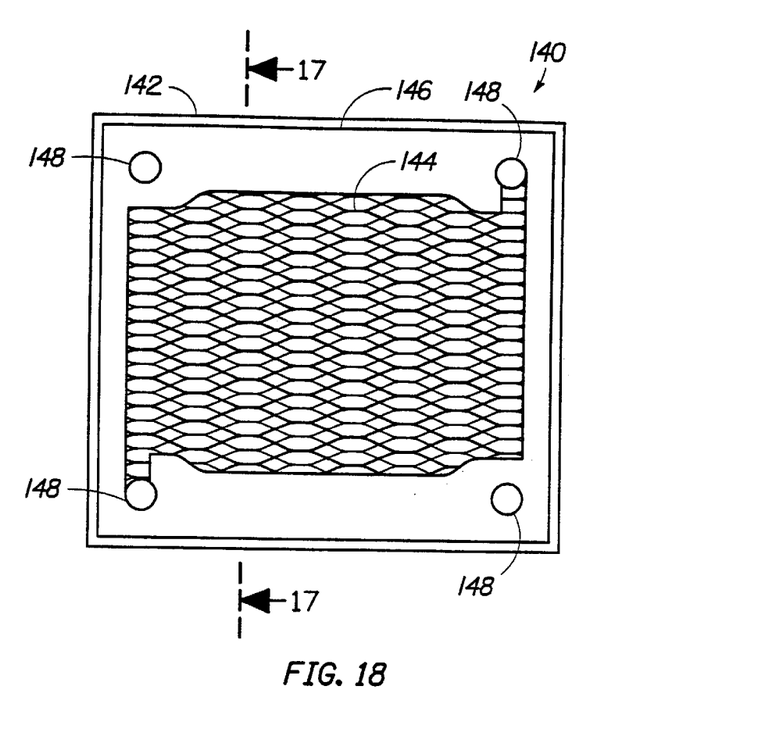
FIG. 18 is a frontal view of a bipolar plate having a partially polymer filled porous metal gas barrier with metal flow fields and polymer cell frames, which also serve as gaskets. The polymer cell frame furnishes sealing and gas channeling between the manifolds and the metal flow field.

Now referring to FIGS. 17 and 18, a partial cross-sectional view and a face view of a lighter version of an all metal bipolar plate 140 is shown having a metal gas barrier 142 with metal flow fields 144 and polymer cell frame 146 which also serves as the gasket. The metal gas barrier 142 extends beyond the edges of the flow field, preferably to the edges of the stack. The polymer cell frames 146 are preferably positioned on both sides of the gas barrier 142 in a face-to-face relationship to provide a gas-tight or liquid-tight seal therebetween. While the frames 146 may be bonded, attached or otherwise secured to the gas barrier 142 and/or the flow fields 144, it is equally preferred that the frames be positioned around the perimeter of the flow field and rely on the compression of the stack to provide a seal with the gas barrier 142.

The relatively thick polymeric flame/gaskets (polymer cell frame 146) positioned on each side of the gas barrier 142 replace the metal frame typically positioned or secured around the perimeter of the flow field. This design reduces the weight of the bipolar plate and the resulting stack by substituting a lower density polymer for the metal frame, and eliminates the need for any thin gaskets as may be typically required between a metal frame and adjacent metal components. The polymer cell frame 146, as illustrated in FIG. 18, furnishes sealing and gas channeling between the manifolds 148 and the metal flow field 144.

Figure 19:
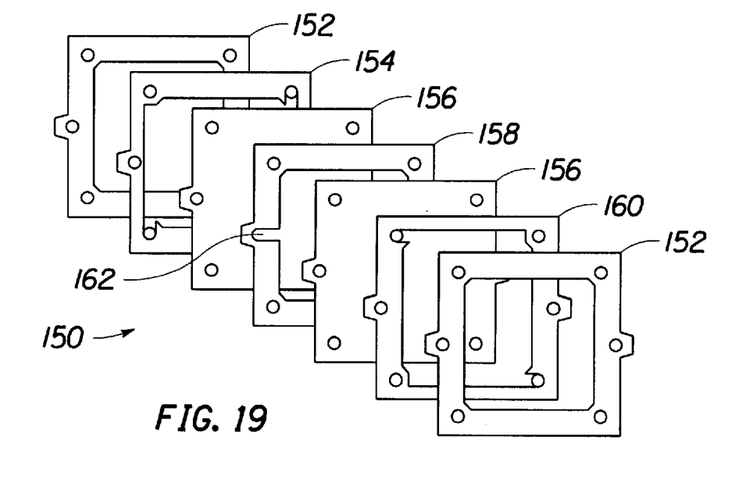
FIG. 19 is a partial assembly diagram of a fluid cooled bipolar plate.

Now referring to FIG. 19, a fluid cooled bipolar plate 150 is shown assembled from a series of planar components including two cooling fluid barriers 156 and a cooling fluid frame 158, with an electrically conducting flow field (not shown) therein. Optionally, the fluid cooled bipolar plate 150 may further include an anode cell frame 154, cathode cell frame 160 and sealing plates 152. This version of the bipolar plate includes an internal cooling flow field for cooling the stack. The cooling fluid flows from a cooling fluid inlet manifold 162 through the cooling flow field (not shown) within the cooling fluid frame 158, and into a cooling fluid outlet manifold generally opposed from the inlet manifold 162. The flow fields in the anode cell frame 154, cooling fluid frame 158 and cathode cell frame 160 have been omitted from FIG. 19 for purposes of simplification.

Figure 20:
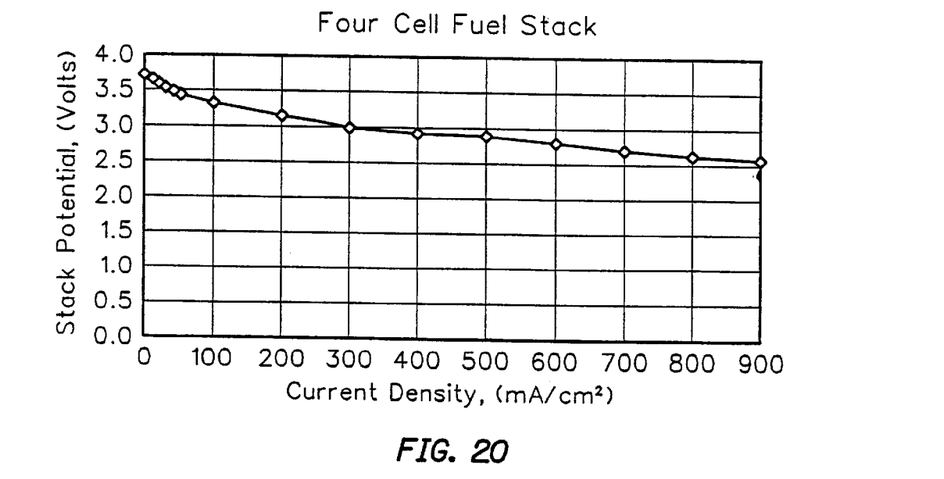
FIG. 20 provides a polarization curve for a four-cell fuel cell stack, assembled similarly to the stack of FIG. 19, having two bipolar plates with internal water cooling and one with only a gas barrier, and no cooling.

FIG. 20 provides a polarization curve, demonstrating the performance of a four-cell fuel cell stack having two bipolar plates with internal water cooling as in FIG. 19 and one with only a gas barrier, and no cooling. The stack had cells with an active area of 32 cm$^2$ and operated on hydrogen and air at a pressure of 10 psig and a temperature of 62° C.

While the foregoing is directed to the preferred embodiment of the present invention, other and further embodiments of the invention may be devised without departing from the basic scope thereof, and the scope thereof is determined by the claims which follow.

What is claimed is:

1. A fluid cooled bipolar plate comprising;
an electrically conducting anode flow field;
an electrically conducting cathode flow field; and
an electrically conducting cooling fluid flow field in electrical communication between the anode flow field and the cathode flow field, wherein the cooling fluid flow field includes fluid impermeable barriers defining a fluid passage.

2. The fluid cooled bipolar plate of claim 1, further comprising cooling fluid inlet and outlet manifolds connected to the cooling fluid flow field.

3. The fluid cooled bipolar plate of claim 1, further comprising a frame disposed around the cooling fluid flow field.

4. The fluid cooled bipolar plate of claim 1, further comprising a frame disposed around the anode flow field and another frame disposed around the cathode flow field.

5. The fluid cooled bipolar plate of claim 1, wherein the electrically conducting cooling fluid flow field is constructed of material selected from the group consisting of expanded metal mesh, metal foam, conducting polymer foam, porous conductive carbon material and combinations thereof.

6. The fluid cooled bipolar plate of claim 1, wherein the electrically conducting cooling fluid flow field is constructed of metal foam selected from the group consisting of copper, aluminum, nickel, titanium, silver and stainless steel.

7. The fluid cooled bipolar plate of claim 6, wherein the metal foam has a maximum density of about 50 percent metal by volume.

8. The fluid cooled bipolar plate of claim 6, wherein the metal foam has a density of between 3 and about 15 percent metal by volume.

9. The fluid cooled bipolar plate of claim 6, wherein the metal foam has a density of between about 5 percent and about 10 percent by volume.

10. The fluid cooled bipolar plate of claim 1, wherein the electrically conducting cooling fluid flow field is constructed of expanded metal mesh constructed of material selected from the group consisting of titanium, SS, Al, Mg, and alloys thereof.

11. The fluid cooled bipolar plate of claim 1, wherein the fluid impermeable barriers are plates on both sides of the cooling fluid flow field, the plates constructed of material selected from the group consisting of titanium, SS, Al, Mg, and alloys thereof.

12. The fluid cooled bipolar plate of claim 3, wherein the frame disposed around the cooling fluid flow field further comprises channels for fluid communication between flow field and the inlet and outlet manifolds.

13. The fluid cooled bipolar plate of claim 12, further comprising channels cut into the cooling fluid flow field communicating to the inlet and outlet manifolds.

14. The fluid cooled bipolar plate of claim 13, wherein the channels are cut in an interdigitated pattern.

15. The fluid cooled bipolar plate of claim 3, wherein the frame is a polymeric frame that also serves as a gasket.

16. The fluid cooled bipolar plate of claim 1, wherein the cooling fluid flow field is constructed of porous material selected from the group consisting of metal foam, conducting polymer foam and combinations thereof, with gas impermeable material disposed within the foam material, and a plurality of cooling fluid channels disposed through the gas impermeable material.

17. The fluid cooled bipolar plate of claim 16, wherein the cooling fluid channels firmly hold a plurality of hollow tubes.

18. The fluid cooled bipolar plate of claim 16, wherein the gas impermeable material is a polymer.

19. The fluid cooled bipolar plate of claim 16, wherein the gas impermeable material is a thermoplastic material selected from the group consisting of polyethersulfone, polycarbonate, and nylon 6.

20. The fluid cooled bipolar plate of claim 17, wherein the hollow tubes are made of metal.

21. The fluid cooled bipolar plate of claim 18, wherein the gas impermeable material is a water permeable polymer selected from the group consisting of perfluorinated sulphonic acid polymers and cellulose acetate.

22. The fluid cooled bipolar plate of claim 17, wherein the hollow tubes are water permeable.

23. The fluid cooled bipolar plate of claim 17, further comprising a plastic frame peripherally enclosing the cooling fluid flow field with the hollow tubes protruding there from.

24. The fluid cooled bipolar plate of claim 23, wherein the hollow tubes extend beyond the metal foam sheets and communicate with the manifolds.

25. The fluid cooled bipolar plate of claim 17, further comprising a dual frame plate having two members wherein the bipolar plate is positioned within the dual frame members with the hollow tubes extending there from.

26. The fluid cooled bipolar plate of claim 17, further comprising a plastic frame peripherally enclosing the cooling fluid flow field with the hollow tubes protruding there from.

27. The fluid cooled bipolar plate of claim 23, wherein the hollow tubes extend beyond the metal foam sheets and communicate with the manifolds.

28. The fluid cooled bipolar plate of claim 17, further comprising a dual frame plate having two members wherein the bipolar plate is positioned within the dual frame members with the hollow tubes extending there from.

29. The fluid cooled bipolar plate of claim 25, further comprising two gaskets between the dual frame members made of elastic material, each having mating holes therein to form the manifolds.

30. The fluid cooled bipolar plate of claim 26, wherein the gaskets are made of polytetrafluoroethylene.

31. The fluid cooled bipolar plate of claim 1, wherein the cooling flow field is constructed of foam material selected from the group consisting of metal foam, conducting polymer foam and combinations thereof, with gas impermeable material disposed on each face of the foam material, and a plurality of cooling fluid channels disposed through the foam material.

32. The fluid cooled bipolar plate of claim 31, wherein the cooling fluid channels firmly hold a plurality of hollow tubes.

33. The fluid cooled bipolar plate of claim 31, wherein the gas impermeable material is a polymer.

34. The fluid cooled bipolar plate of claim 31, wherein the gas impermeable material is a thermoplastic material selected from the group consisting of polyethersulfone, polycarbonate, and nylon 6.

35. The fluid cooled bipolar plate of claim 32, wherein the hollow tubes are made of metal.

36. The fluid cooled bipolar plate of claim 32, wherein the gas impermeable material is a water permeable polymer selected from the group consisting of perfluorinated sulphonic acid polymers and cellulose acetate.

37. The fluid cooled bipolar plate of claim 36, wherein the hollow tubes are water permeable.

38. The fluid cooled bipolar plate of claim 32, further comprising a plastic frame peripherally enclosing the cooling fluid flow field with the hollow tubes protruding therefrom.

39. The fluid cooled bipolar plate of claim 32, wherein the hollow tubes extend beyond the metal foam sheets and communicate with the manifolds.

40. The fluid cooled bipolar plate of claim 31, further comprising a dual frame plate having two members wherein the bipolar plate is positioned within the dual frame members with the hollow tubes extending there from.

41. The fluid cooled bipolar plate of claim 40, further comprising two gaskets between the dual frame members made of elastic material, each having mating holes therein to form the manifolds.

42. The fluid cooled bipolar plate of claim 41, wherein the gaskets are made of polytetrafluoroethylene.

* * * * *